(12) United States Patent
Weh et al.

(10) Patent No.: US 12,403,872 B2
(45) Date of Patent: Sep. 2, 2025

(54) HYDRAULIC BLOCK FOR A BRAKE UNIT OF A HYDRAULIC POWER BRAKE SYSTEM

(71) Applicant: Robert Bosch GmbH, Stuttgart (DE)

(72) Inventors: Andreas Weh, Sulzberg (DE); Matthias Mayr, Rettenberg (DE); Stefan Kaserer, Ofterschwang (DE)

(73) Assignee: ROBERT BOSCH GMBH, Stuttgart (DE)

(*) Notice: Subject to any disclaimer, the term of this patent is extended or adjusted under 35 U.S.C. 154(b) by 94 days.

(21) Appl. No.: 18/550,434

(22) PCT Filed: Apr. 12, 2022

(86) PCT No.: PCT/EP2022/059685
§ 371 (c)(1),
(2) Date: Sep. 13, 2023

(87) PCT Pub. No.: WO2022/263041
PCT Pub. Date: Dec. 22, 2022

(65) Prior Publication Data
US 2024/0157925 A1  May 16, 2024

(30) Foreign Application Priority Data

Jun. 15, 2021 (DE) ..................... 10 2021 206 074.9

(51) Int. Cl.
*B60T 7/04* (2006.01)
*B60T 8/36* (2006.01)
*F15B 13/08* (2006.01)

(52) U.S. Cl.
CPC ............... *B60T 7/042* (2013.01); *B60T 8/368* (2013.01); *F15B 13/0814* (2013.01)

(58) Field of Classification Search
CPC ........ B60T 8/368; B60T 7/042; B60T 13/686; B60T 13/745; B60T 17/00; F15B 13/0814
See application file for complete search history.

(56) References Cited

U.S. PATENT DOCUMENTS

| | | | |
|---|---|---|---|
| 6,688,707 B1 * | 2/2004 | Dinkel | B60T 8/368 303/DIG. 10 |
| 8,020,946 B2 * | 9/2011 | Iyatani | B60T 8/368 303/119.2 |
| 8,523,295 B2 * | 9/2013 | Bareiss | F15B 13/0814 303/DIG. 10 |
| 9,404,514 B2 * | 8/2016 | Weh | F15B 13/0803 |
| 9,470,247 B2 * | 10/2016 | Alaze | F15B 13/0814 |
| 9,688,256 B2 * | 6/2017 | Weh | B60T 8/368 |

(Continued)

FOREIGN PATENT DOCUMENTS

DE 102006033764 A1 * 8/2007 .............. B60T 17/02
DE 102012213216 A1 2/2013

(Continued)

OTHER PUBLICATIONS

International Search Report for PCT/EP2022/059685, Issued Jul. 6, 2022.

*Primary Examiner* — David Colon-Morales
(74) *Attorney, Agent, or Firm* — NORTON ROSE FULBRIGHT US LLP

(57) ABSTRACT

A bore arrangement of a hydraulic block of a brake unit of a hydraulic power vehicle brake system.

11 Claims, 5 Drawing Sheets

(56) References Cited

U.S. PATENT DOCUMENTS

| | | | |
|---|---|---|---|
| 10,308,232 B2 * | 6/2019 | Mayr | B60T 8/368 |
| 11,052,888 B2 * | 7/2021 | Mayr | B60T 8/368 |
| 11,485,336 B2 * | 11/2022 | Ahn | B60T 13/168 |
| 11,807,200 B2 * | 11/2023 | Ahn | B60T 13/141 |
| 11,814,022 B2 * | 11/2023 | Seo | B60T 13/142 |
| 2012/0177516 A1 * | 7/2012 | Mayr | F04B 53/22 |
| | | | 417/437 |
| 2019/0031164 A1 * | 1/2019 | Tandler | B60T 8/368 |
| 2019/0210576 A1 * | 7/2019 | Zander | B60T 17/04 |
| 2020/0017089 A1 * | 1/2020 | Zander | F15B 13/0842 |
| 2020/0094800 A1 * | 3/2020 | Zander | B60T 8/4836 |
| 2020/0282968 A1 * | 9/2020 | Mayr | B60T 7/042 |

FOREIGN PATENT DOCUMENTS

| | | | | |
|---|---|---|---|---|
| DE | 102014207545 A1 * | 10/2015 | | B60T 17/02 |
| DE | 102014213732 A1 * | 1/2016 | | B60T 13/146 |
| DE | 102016202113 A1 | 8/2017 | | |
| DE | 102019203308 A1 * | 9/2020 | | B60T 13/142 |
| EP | 2883766 A1 | 6/2015 | | |
| KR | 20190090637 A | 8/2019 | | |

* cited by examiner

HYDRAULIC BLOCK FOR A BRAKE UNIT OF A HYDRAULIC POWER BRAKE SYSTEM

FIELD

The present invention relates to a hydraulic block for a brake unit of a hydraulic power brake system for an automobile.

BACKGROUND INFORMATION

German Patent Application No. DE 10 2016 202 113 A1 describes a narrow, cuboidal hydraulic block for a hydraulic unit of a slip-controlled, hydraulic power brake system having three connections for a brake fluid reservoir in a top side of the hydraulic block. Below the connections, a master brake cylinder bore passes continuously through the hydraulic block, parallel to the top side, from one narrow side to an opposing narrow side adjoining the top side. Below the master brake cylinder bore, a power cylinder bore passes through the hydraulic block transversely to the master brake cylinder bore from one large side of the hydraulic block to an opposing large side of the hydraulic block, which large sides adjoin the top side and the two narrow sides of the hydraulic block. To generate a brake pressure using external power, a power piston can be displaced in the power cylinder bore by an electric motor via a ball screw. The electric motor is arranged externally on the hydraulic block, coaxially to the power cylinder bore, and the ball screw is located between the electric motor and the power piston—likewise coaxially to the electric motor and to the power cylinder bore. The electric motor and the ball screw form a power drive and—together with the power piston and the power cylinder bore—a power brake pressure generator for the hydraulic vehicle brake system. Connections for hydraulic wheel brakes via brake lines are incorporated in one of the two large sides of the hydraulic block in close proximity to the top side at the height of the connections for the brake fluid reservoir. A simulator cylinder bore for a pedal travel simulator of the power brake system is incorporated in a bottom side, opposite the top side, of the conventional hydraulic block.

SUMMARY

A hydraulic block according to the present invention is provided for a brake unit of a hydraulic power brake system for an automobile, which power brake system comprises a brake pressure control system. Brake pressure control refers to the generation and control of a brake pressure in the vehicle brake system, in brake circuits of the vehicle brake system and/or in hydraulic wheel brakes of the brake system, which are connected to the hydraulic block. The brake pressure control system may, in particular, also comprise a slip control system. Slip control systems are, for example, anti-lock brake systems, traction control systems and/or vehicle dynamics management for which the abbreviations ABS, TCS and/or VDM are commonly used. Slip control systems are conventional and are not explained here.

The hydraulic block serves for the mechanical fastening and hydraulic interconnection of hydraulic elements of the vehicle brake system, for the generation of brake pressure and/or for brake pressure control and/or slip control. Such hydraulic elements are, inter alia, solenoid valves, non-return valves, hydraulic accumulators, damper chambers and pressure sensors. The hydraulic elements are fastened in receptacles in the hydraulic block, which are usually formed as cylindrical depressions, blind holes or through holes, in some cases with stepped diameters. "Interconnection" means that the receptacles or the hydraulic elements fastened therein are connected via lines in the hydraulic block according to a hydraulic circuit diagram of the vehicle brake system. The lines are typically, but not necessarily, drilled in the hydraulic block.

Equipped with the hydraulic elements of the vehicle brake system or its slip control system, the hydraulic block forms the brake unit, "equipped" meaning that the hydraulic elements are fastened in the respective receptacles of the hydraulic block which are provided for them.

The present invention is directed in particular to a bore arrangement of the hydraulic block, i.e. to the routing of lines between the hydraulic elements or their receptacles in the hydraulic block.

The hydraulic block according to an example embodiment of the present invention has a top side, which is provided for seating a brake fluid reservoir. In the top side, the hydraulic block has one or more connections for the brake fluid reservoir.

A fastening side of the hydraulic block, which adjoins the top side of the hydraulic block, is designed for fastening the hydraulic block or the brake unit, i.e., the hydraulic block equipped with the hydraulic elements of the vehicle brake system, to a bulkhead of an automobile. To this end, the hydraulic block has, on the fastening side, for example two standardized internally threaded holes, in which studs or stay bolts can be screwed to fasten the hydraulic block or the brake unit to the bulkhead of the automobile. A master brake cylinder bore leads into the fastening side of the hydraulic block so that a master brake cylinder piston can be displaced in the master brake cylinder bore using muscular power via a brake pedal incorporated opposite the hydraulic block on the bulkhead of the automobile and via a pedal rod, which connects the brake pedal to the master brake cylinder piston in an articulated manner. The master brake cylinder bore preferably extends parallel to the top side in the hydraulic block.

According to an example embodiment of the present invention, a power cylinder bore for generating a brake pressure using external power is incorporated in the hydraulic block transversely to the master brake cylinder bore, between the top side of the hydraulic block and the master brake cylinder bore. The master brake cylinder bore is therefore located below the power cylinder bore, i.e., the master brake cylinder bore is located on a side of the power cylinder bore which is remote from the top side of the hydraulic block or between the power cylinder bore and a bottom side, opposite the top side, of the hydraulic block. The power cylinder bore leads into a motor side of the hydraulic block, which adjoins the top side and the fastening side and is provided for fastening an electric motor for driving a power brake pressure generator.

According to an example embodiment of the present invention, a simulator cylinder bore for a pedal travel simulator is likewise incorporated in the hydraulic block transversely to the master brake cylinder bore, between the top side of the hydraulic block and the master brake cylinder bore, i.e. above the master brake cylinder bore. It preferably leads into a valve side, opposite the motor side, of the hydraulic block and, like the motor side, adjoins the top side and the fastening side.

According to an example embodiment of the present invention, a second return line in the hydraulic block runs from a receptacle for an outlet valve of the vehicle brake system to one of the connections for the brake fluid container through the simulator cylinder bore. The return line is a line for brake fluid, which is produced in the hydraulic block by drilling or in another manner. The second return line preferably runs from the receptacle for the outlet valve to the simulator cylinder bore and, obliquely with respect to the motor side, from the simulator cylinder bore to the connection for the brake fluid container in the top side of the hydraulic block. Moreover, the second return line may run to the master brake cylinder.

According to an example embodiment of the present invention, the second return line is arranged in the hydraulic block such that it leads into the simulator cylinder bore on a rear side of a simulator piston. The simulator piston divides the simulator cylinder bore into a pressurized working chamber on a front side of the simulator piston, which is connected to the master brake cylinder by a simulator valve, and into an unpressurized chamber on the rear side of the simulator piston, which communicates with the unpressurized brake fluid container. According to the present invention, the second return line runs through the unpressurized chamber of the simulator cylinder bore.

According to a configuration of an example embodiment of the present invention, a first return line in the hydraulic block runs from a receptacle for an outlet valve to the power cylinder bore and from the power cylinder bore to one of the connections for the brake fluid container. The two return lines preferably connect different receptacles for outlet valves to different connections for the brake fluid container. The first return line can be implemented independently of the above-described routing of the second return line.

Through holes or blind holes in the hydraulic block which are referred to as "lines" or "bores" or as "cylinder bores" here may also be produced in a manner other than drilling.

Advantageous configurations and example embodiments of the present invention are disclosed herein.

All of the features disclosed in the description herein and in the figures may be implemented alone or in essentially any combination in specific embodiments of the present invention. Embodiments of the present invention which include only one or multiple features of a specific embodiment of the present invention, rather than all features, are essentially possible. For example, embodiments of the present invention in which the connections for the auxiliary brake unit are arranged at a different point to that described herein are also possible.

BRIEF DESCRIPTION OF THE DRAWINGS

The present invention is explained in more detail below with reference to a specific example embodiment depicted in the figures.

The figures are partially simplified depictions which are drawn to different scales in some cases.

DETAILED DESCRIPTION OF EXAMPLE EMBODIMENTS

Figure 1:
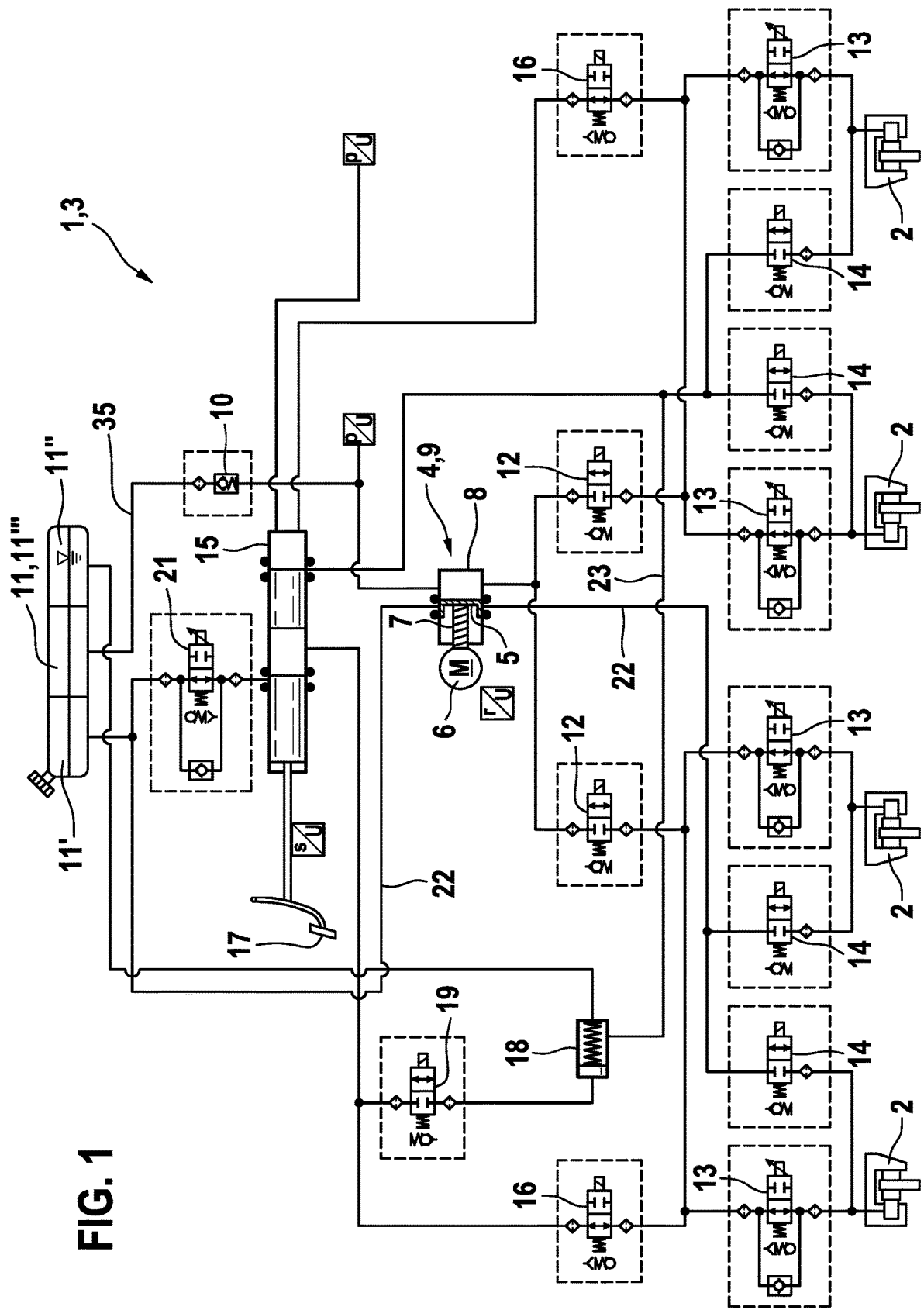
FIG. 1 shows a hydraulic circuit diagram of an electrohydraulic power brake system, according to an example embodiment of the present invention.

The electrohydraulic power brake system 1 depicted in FIG. 1 is provided for automobiles having four wheel brakes 2. It has a brake unit 3 to which the four wheel brakes 2 are connected via brake lines. The vehicle brake system 1 is designed as a dual-circuit brake system; two wheel brakes 2 are connected to one brake circuit in each case.

For power braking, the power brake system 3 has a piston-cylinder unit 4 whereof the piston 5 can be displaced in a cylinder 8 by an electric motor 6 via a screw drive 7 as a rotation/translation converter gear. The electric motor 6, the screw drive 7 and the piston-cylinder unit 4 form a power brake pressure generator 9 of the brake unit 3 for generating a brake pressure for braking using external power. Power braking, for which a brake pressure is generated by the power brake pressure generator 9, is the normal and intended brake actuation, i.e. service braking.

The power brake pressure generator 9, i.e. the cylinder 8 of the piston-cylinder unit 4 of the power brake pressure generator 9, is connected to a chamber 11''' of a brake fluid container 11 by a non-return valve 10 and the wheel brakes 2 are connected to the cylinder 8 of the piston-cylinder unit 4 of the power brake pressure generator 9 via a service brake valve 12 in each brake circuit, which service brake valves are hydraulically connected to each other in parallel.

The brake system 1 has, for each wheel brake 2, an inlet valve 13 and an outlet valve 14, with which wheel brake pressures in each wheel brake 2 can be controlled individually. The wheel brake pressures in the wheel brakes 2, and therefore brake forces of the wheel brakes 2, can thus be controlled without slip during normal operation. Moreover, slip control systems, such as anti-lock and traction control systems and vehicle dynamics management—which are also referred to colloquially as anti-skid systems—automatic brake systems, distance control systems and the like, are also possible. Such control systems are conventional and are not explained in more detail here. The inlet valves 13 and the outlet valves 14 may also be referred to as wheel brake pressure control valve arrangements 13, 14. In each brake circuit, two inlet valves 13 are hydraulically connected to the power brake pressure generator 9 in parallel via a service brake valve 12.

Besides the power brake pressure generator 9, the brake system 1 has a dual-circuit master brake cylinder 15 which can be actuated using muscular power and to which the wheel brakes 2 in each brake circuit are connected via an isolation valve 16 and two inlet valves 13. The master brake cylinder 15 serves as a setpoint value indicator for the wheel brake pressures to be set in the wheel brakes 2. The brake pressure during power braking is generated by the power brake pressure generator 9. The master brake cylinder 14 is hydraulically isolated from the wheel brakes 2 during power braking by closing the isolation valves 16. In the event of a failure of the power brake pressure generator 9, the brake pressure is generated by actuating the master brake cylinder 15 using muscular power (so-called auxiliary braking).

So that, when the isolation valves 16 are closed, brake fluid may be displaced from the master brake cylinder 15 and pistons of the master brake cylinder 15 and a brake pedal 17 may be moved, the brake unit 3 has a pedal travel simulator 18, which is connected to the master brake cylinder 15 in a brake circuit via a simulator valve 19. The pedal travel simulator 18 is a piston-cylinder unit having a spring-loaded piston.

In the described and depicted specific embodiment of the present invention, the inlet valves 13 and the isolation valves 17 are 2/2-way solenoid valves which are open in their currentless normal positions and the service brake valves 12 of the power brake pressure generator 9, the outlet valves 14 and the simulator valve 19 are 2/2-way solenoid valves which are closed in their currentless normal positions.

The hydraulic elements of the electrohydraulic power brake system 1, namely the valves 12, 13, 14, 16, 19, 21 of the power brake pressure generator 9, the master brake cylinder 15, the pedal travel simulator 18 and further elements such as pressure sensors, are arranged in receptacles of a hydraulic block 20 of the brake unit 3 and connected to each other via a bore arrangement of the hydraulic block 20 according to the hydraulic circuit diagram (depicted in FIG. 1) of the vehicle brake system 1. A receptacle 21' for the test valve 21 communicates with the master brake cylinder bore 15' via a bore 42 which runs axially from a base of the receptacle 21' to a groove 38 surrounding the master brake cylinder bore 15' (FIG. 3B). The groove 38 and the bore 42 leading into it are shown offset into the section plane in FIG. 3B. They are actually located behind the bore 42 and the oblique bore 39 as viewed looking onto the fastening side 29 of the hydraulic block 20.

Moreover, an oblique bore 39 runs from the base of the receptacle 21' for the test valve 21 to a horizontal bore 40, which runs to the first return line 22 between the master brake cylinder bore 15' and the valve side such that it is parallel to the master brake cylinder bore 15', whereby the receptacle 21' for the test valve 21 is connected to one of the connections 27' for the brake fluid container 11 (FIG. 3B).

In one of the two brake circuits, the master brake cylinder 15 is connected to one of the chambers 11' of the brake fluid reservoir 11 via a test valve 21. In the exemplary embodiment, the test valve 21 is likewise a 2/2-way solenoid valve which is open in its currentless normal position. In the other brake circuit, the master brake cylinder 15 is connected to a rear side of the pedal travel simulator 19, which is in turn connected to a chamber 11" of the brake fluid container 11 and is therefore unpressurized. The rear side of the pedal travel simulator 19 refers to one of two chambers of the cylinder of the pedal travel simulator 19 into which the cylinder of the pedal travel simulator 19 is divided by the piston of the pedal travel simulator 19. A front side of the pedal travel simulator 19 is connected to the master brake cylinder 15 via the simulator valve 19 and is pressurized by the master brake cylinder 15 when the simulator valve 19 is open.

In one brake circuit, the outlet valves 14 are connected to a chamber 11' of the brake fluid container 11 via a first return line 22, which, in the cylinder 8 of the piston-cylinder unit 4 of the power brake pressure generator 9, runs around the piston 5 of the piston-cylinder unit 4. In the other brake circuit, the outlet valves 14 are connected to another chamber 11" of the brake fluid container 11 via a second return line 23 together with the master brake cylinder 15.

Figure 2:
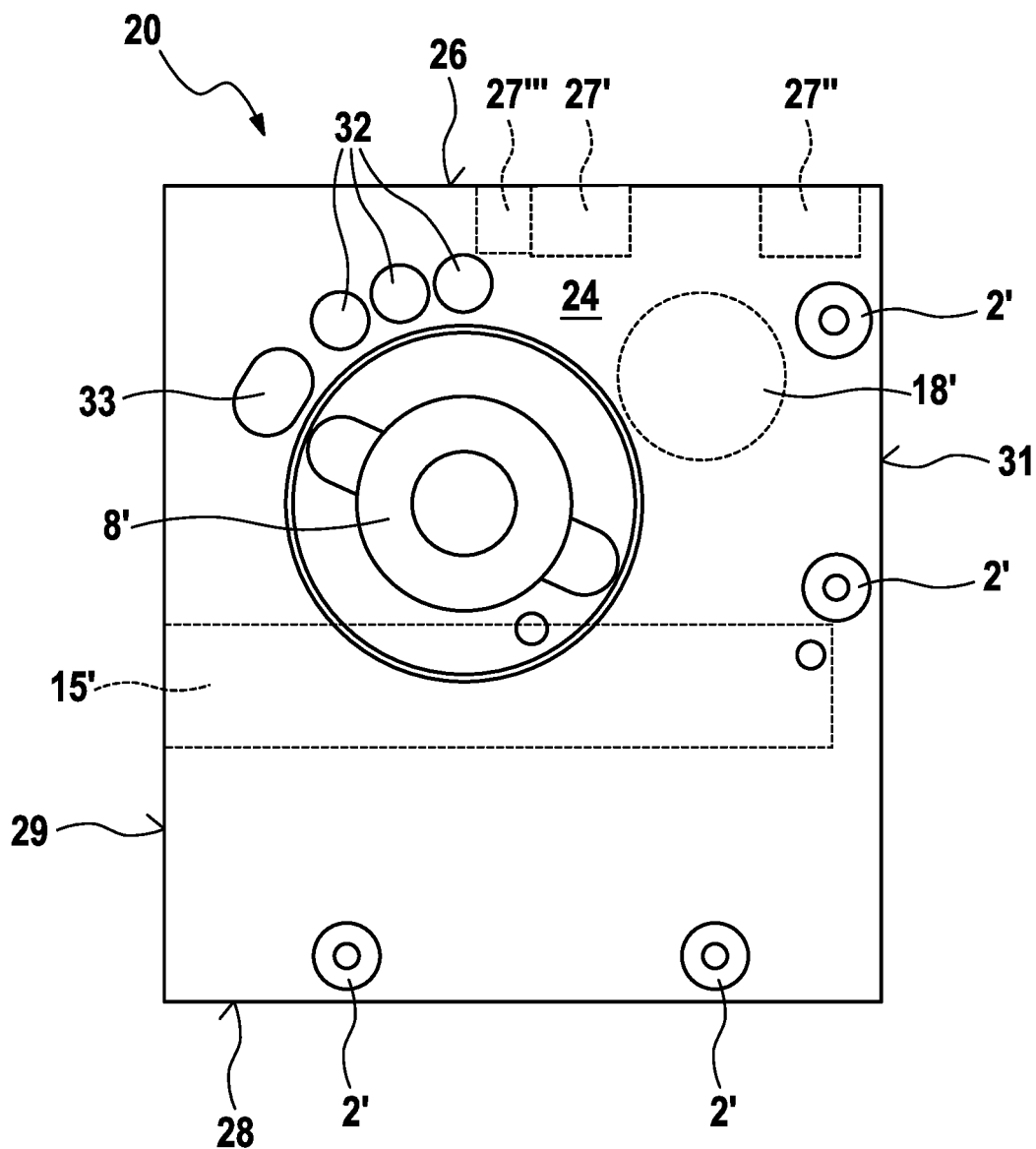
FIG. 2 shows a motor side of a hydraulic block according to an example embodiment of the present invention for a brake unit of the vehicle brake system of FIG. 1.
Figure 3:
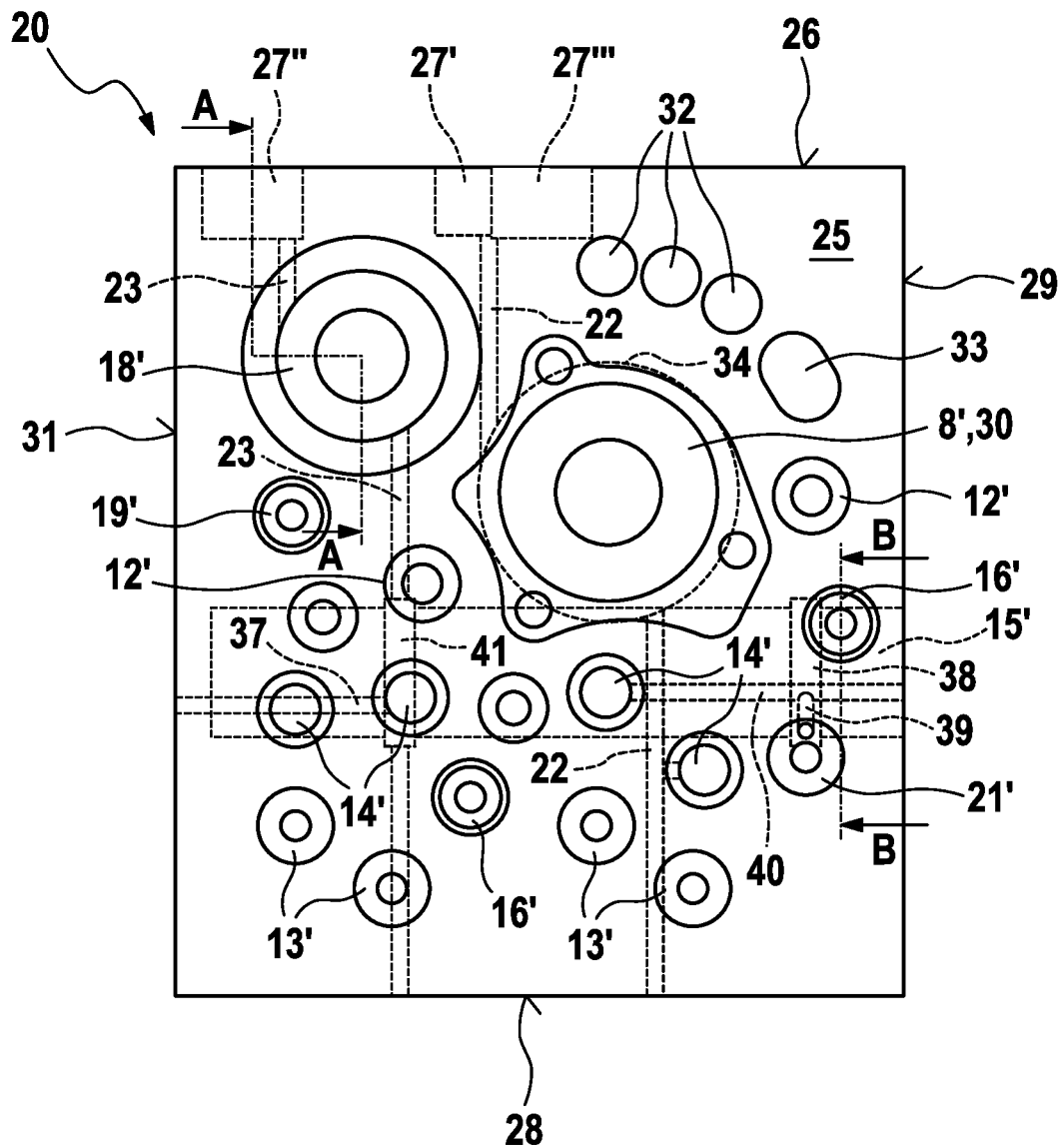
FIG. 3 shows a valve side, opposite the motor side, of the hydraulic block of FIG. 2, according to an example embodiment of the present invention.

FIG. 2 shows a motor side 24 and FIG. 3 shows a valve side 25 of the hydraulic block 20 of the brake unit 3. In the exemplary embodiment, the hydraulic block 20 is a flat, cuboidal metal block, which serves for the mechanical fastening and hydraulic interconnection of the hydraulic elements of the power brake system 1. Equipped with the hydraulic elements, the hydraulic block 20 forms the brake unit 3 of the vehicle brake system 1. "Flat" means that the hydraulic block 20 is approximately three to four times as wide or long as it is thick. In the exemplary embodiment, two opposing large sides of the hydraulic block 20 are virtually cuboidal and form the motor side 24 and the valve side 25. In FIGS. 2 and 3, the hydraulic block 20 is shown in the unequipped state, i.e. without the hydraulic elements.

A narrow side of the hydraulic block 20, which is referred to as the top side 26 here, has three cylindrical blind holes as connections 27', 27", 27'" for the chambers 11', 11", 11'" of the brake fluid container 11, which is arranged on the top side 26 of the hydraulic block 20 (not depicted). At the bottom of the brake fluid reservoir 11, connection nipples reach into the blind holes of the hydraulic block 20, which form the connections 27', 27", 27'", and are sealed there using O rings.

In the hydraulic block 20, a master brake cylinder bore 15', which forms the master brake cylinder 15, is incorporated parallel to the top side 26 and in a center between the motor side 24 and the valve side 25. In FIGS. 2 and 3, the master brake cylinder bore 15' is depicted by dashed lines. In the exemplary embodiment, it is located somewhat below a center of the hydraulic block 20 between the top side 26 and an opposing bottom side 28 of the hydraulic block 20, so that the master brake cylinder bore 15' lies approximately tangentially against a center plane of the hydraulic block 20 between the top side 26 and the bottom side 28.

The master brake cylinder bore 15' is open at a narrow side of the hydraulic block 20; it leads into this narrow side of the hydraulic block 20 or has a mouth there. The narrow side of the hydraulic block 20, in which the master brake cylinder bore 15' is open or into which it leads, is referred to here as the fastening side 29 of the hydraulic block 20. It adjoins the top side 26, the motor side 24, the valve side 25 and the bottom side 28 of the hydraulic block 20 and is provided for fastening the hydraulic block 20 to a bulkhead (not depicted) of the automobile. The hydraulic block 20 is fastened to the bulkhead of the automobile such that the top side 26 with the brake fluid container 11 is located at the top. The master brake cylinder bore 15' is open at the fastening side 29 of the hydraulic block 20 so that a master brake cylinder piston can be displaced in the master brake cylinder bore 15' by the foot brake pedal 17, which is fastened to an opposing side of the bulkhead, via a pedal rod which connects the master brake cylinder piston to the foot brake pedal 17 in an articulated manner. The foot brake pedal 17 and the pedal rod are not shown in FIGS. 2 and 3.

A power cylinder bore 8', which forms the cylinder 8 of the power brake pressure generator 9, is incorporated perpendicularly to the master brake cylinder bore 15' in the motor side 24 of the hydraulic block 20 and protrudes over the valve side 25 in the manner of a dome 30. The power cylinder bore 8' is located somewhat above the master brake cylinder bore 15', i.e. between the master brake cylinder bore 15' and the top side 26 of the hydraulic block 20. The power cylinder bore 8' passes the master brake cylinder bore 15' orthogonally with a slight spacing. It is arranged somewhat eccentrically offset in the direction of the fastening side 29 of the hydraulic block 20.

The electric motor 6 of the power brake pressure generator 9, which is not shown in FIG. 2, is arranged externally on the motor side 24 of the hydraulic block 20, coaxially to the power cylinder bore 8'. A planetary gear as a reducing gear and the screw drive 7, which is a ball screw in the exemplary embodiment, are arranged coaxially to the power cylinder bore 8' between the electric motor 6 and the piston 5 of the power brake pressure generator 9 (not shown in FIG. 2).

A cylinder bore 18' of the pedal travel simulator 18 is incorporated in the valve side 25 of the hydraulic block 20 such that it is parallel to the power cylinder bore 8' and perpendicular to the master brake cylinder bore 15'. In the exemplary embodiment, the cylinder bore 18' is located between the master brake cylinder bore 15' and the top side 26 of the hydraulic block 20 and in closer proximity to the top side 26 than to the master brake cylinder bore 15' and between the power cylinder bore 8' and a narrow side 31, opposite the fastening side 29, of the hydraulic block 20.

Receptacles 12', 13', 14', 16', 19', 21' for the solenoid valves 12, 13, 14, 16, 19, 21 and receptacles for further elements, such as pressure sensors, are incorporated in the valve side 25 of the hydraulic block 20. The receptacles, which, in FIG. 3, are denoted by the reference numeral of the respective solenoid valve 12, 13, 14, 16, 19, 21 or other element followed by "'" are cylindrical depressions or blind holes in the hydraulic block 20, in some cases with stepped diameters. The hydraulic elements are inserted into the receptacles and caulked around the circumference in a pressure-tight manner. Hydraulic portions of the solenoid valves 12, 13, 14, 16, 19, 21, which form the actual valves, are located in the receptacles; armatures and magnetic coils, which are accommodated in a valve dome, protrude from the valve side 25 of the hydraulic block 20.

The hydraulic block 20 of the brake unit 3 is bored according to the hydraulic circuit diagram shown in FIG. 1. "Bored" or "bore arrangement" refer to the cylinder bores, receptacles for the solenoid valves and connections which are incorporated in the hydraulic block 20 as well as the bores forming the lines connecting them according to the hydraulic circuit diagram. The hydraulic block 20 is Cartesian-bored, i.e. the bores, receptacles, connections, lines etc. are incorporated in the hydraulic block 20 such that they are parallel and perpendicular to each other and to sides and edges of the hydraulic block 20. This does not exclude individual, obliquely extending lines and bores.

Two connections 2' for brake lines which run to two wheel brakes 2 are incorporated in the motor side 24 along the narrow side 31, opposite the fastening side 29, and two connections 2' for brake lines which run to two wheel brakes 2 are incorporated in the motor side 24 in close proximity to the bottom side 28 of the hydraulic block 20. "In close proximity" means a spacing of no more than a radius of the respective connection.

Between the power cylinder bore 8' and the top side 26, three continuous through holes from the motor side 24 to the valve side 25 are incorporated in the hydraulic block 20 as motor connection bores 32 for supplying power to the electric motor 6 of the power brake pressure generator 9. The motor connection bores 32 are incorporated in the hydraulic block 20 on an imaginary arc around the power cylinder bore 8', between the power cylinder bore 8' and the top side 26. A signal bore 33 for control lines and/or signal lines to or from the electric motor 6 is likewise incorporated in the hydraulic block 20 on the imaginary arc on which the motor connection bores 32 are incorporated.

The first return line 22, which is formed as a bore in the hydraulic block 20 and connects two of the receptacles 14' for the outlet valves 14 of two wheel brakes 2 to one of the connections 27' for one of the chambers 11' of the brake fluid container 11 around the piston 5 of the piston-cylinder unit 4 of the power brake pressure generator 9, is depicted by dashed lines in FIG. 3. Starting from the connection 27' for the chamber 11' of the brake fluid container 11, the first return line 22 runs firstly as an oblique bore from a base of the connection 27' to the power cylinder bore 8', which forms the cylinder 8 of the piston-cylinder unit 4 of the power brake pressure generator 9. From the power cylinder bore 8', the first return line 2 extends further downwards, with a parallel offset in the direction of the fastening side 29, between the two receptacles 14' for the two outlet valves 14 through to the bottom side 28 of the hydraulic block 20. The two receptacles 14' are connected to the first return line 22 via transverse bores, which lead into the fastening side 29 of the hydraulic block 20 (not depicted). "Oblique bore" means that the portion of the first return line 22 from the connection 27' for the brake fluid reservoir 11 runs to the power cylinder bore 8' obliquely with respect to the motor side 24 and with respect to the valve side 25 and—in the exemplary embodiment—parallel to the fastening side 29 and to the narrow side 31. Except for the portion from the connection 27' to the power cylinder bore 8', the first return line 22, like all other bores, extends parallel to the sides 24, 25, 26, 28, 29, 31 and edges of the hydraulic block 20. The portion of the first return line 22 which comes from the connection 27' for the brake fluid container 11, and likewise the portion of the first return line 22 which runs to the receptacles 14' for the outlet valves 14, lead into a groove 34 in the power cylinder bore 8', which is located in a radial plane of the power cylinder bore 8' in which the piston 5 of the piston-cylinder unit 4 of the power brake pressure generator 9 is located when it is installed. The first return line 22 thus runs around the piston 5 of the piston-cylinder unit 4 of the power brake pressure generator 9 without communicating with the cylinder 8 of the piston-cylinder unit 4 of the power brake pressure generator 9. The groove 34 in the power cylinder bore 8' is denoted by dashed lines in FIG. 3.

The second return line 23 is likewise depicted by dashed lines in FIG. 3. It runs upwards from the two other receptacles 14' for the outlet valves 14 of two wheel brakes 2 to the cylinder bore 18' of the pedal travel simulator 18 and, from there, further upwards, with a parallel offset in the direction of the narrow side 31 of the hydraulic block 20, to another connection 27" of a chamber 11" of the brake fluid container 11 as the first return line 22.

Figure 3A:
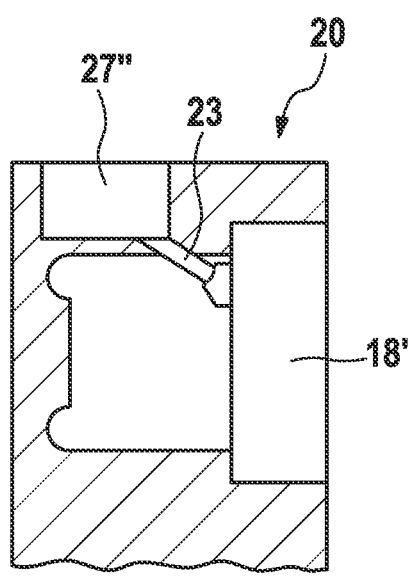
FIG. 3A shows a section of the hydraulic block along the angled section line A-A in FIG. 3.
Figure 3B:
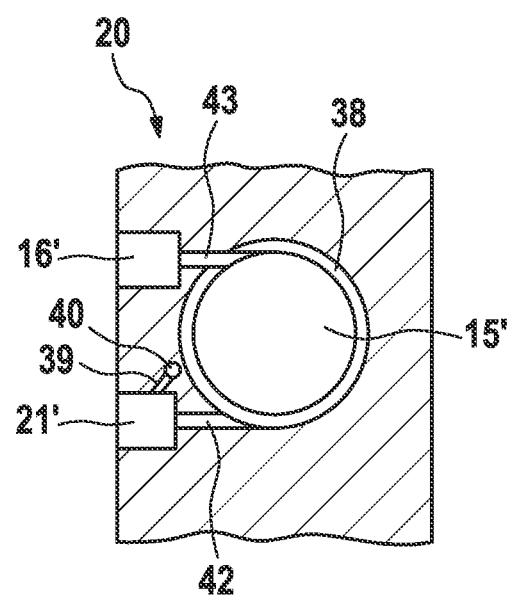
FIG. 3B shows a section of the hydraulic block along line B-B in FIG. 3.

Between the cylinder bore 18' of the pedal travel simulator 18 and the connection 27" of the chamber 11" of the brake fluid container 11, the second return line 23 extends parallel to the fastening side 28 and to the narrow side 31, opposite this fastening side, of the hydraulic block 20, albeit obliquely with respect to the motor side 24 and with respect to the valve side 25 of the hydraulic block 20. The oblique extent of the second return line 23 can be seen in FIG. 3A. The section plane of FIG. 3A has a radial offset with respect to the cylinder bore 18' of the pedal travel simulator 18 in the direction of the fastening side 29 or in the direction of the narrow side 31, opposite the fastening side 29, of the hydraulic block 20. The offset of the section plane of FIG. 3A is shown by the section line A-A in FIG. 3. The portion of the second return line 23 which extends obliquely with respect to the motor side 24 and with respect to the valve side 25 of the hydraulic block 20 between the cylinder bore 18' of the pedal travel simulator 18 and the connection 27" of the chamber 11" of the brake fluid container 11 is shown offset into the section plane in FIG. 3A. The oblique portion of the second return line 23 actually has a radial offset with respect to the connection 27" of the chamber 11" of the brake fluid container 11, which can be seen in FIG. 3.

A transverse bore 37 connects the two receptacles 14' for the outlet valves 14 to each other.

The second return line 23 leads into the master brake cylinder bore 15' so that one of the chambers of the dual-circuit master brake cylinder 15 is connected to one of the chambers 11" of the brake fluid container 11 via the cylinder bore 18' of the pedal travel simulator 18. The second return line 23 leads into a radial plane of the cylinder bore 18' of the pedal travel simulator 18, which is located on a rear side of the piston of the pedal travel simulator 18 and is unpressurized as a result of its connection to the brake fluid container 11.

The second return line 23 is drilled into the hydraulic block 20 from the bottom side 28 and passes radially through the master brake cylinder bore 15' so that a drill bit, when drilling the second return line 23, meets a cylinder wall of the master brake cylinder bore 15' perpendicularly, and not obliquely, as it exits the master brake cylinder bore 15'. As a result, as it exits the master brake cylinder bore 15', the drill bit is not offset tangentially to the master brake cylinder bore 15' and does not break off. The master brake cylinder bore 15' has a circumferential groove 41 into which the second return line 23 leads radially at two diametrically opposed points.

Figure 4:
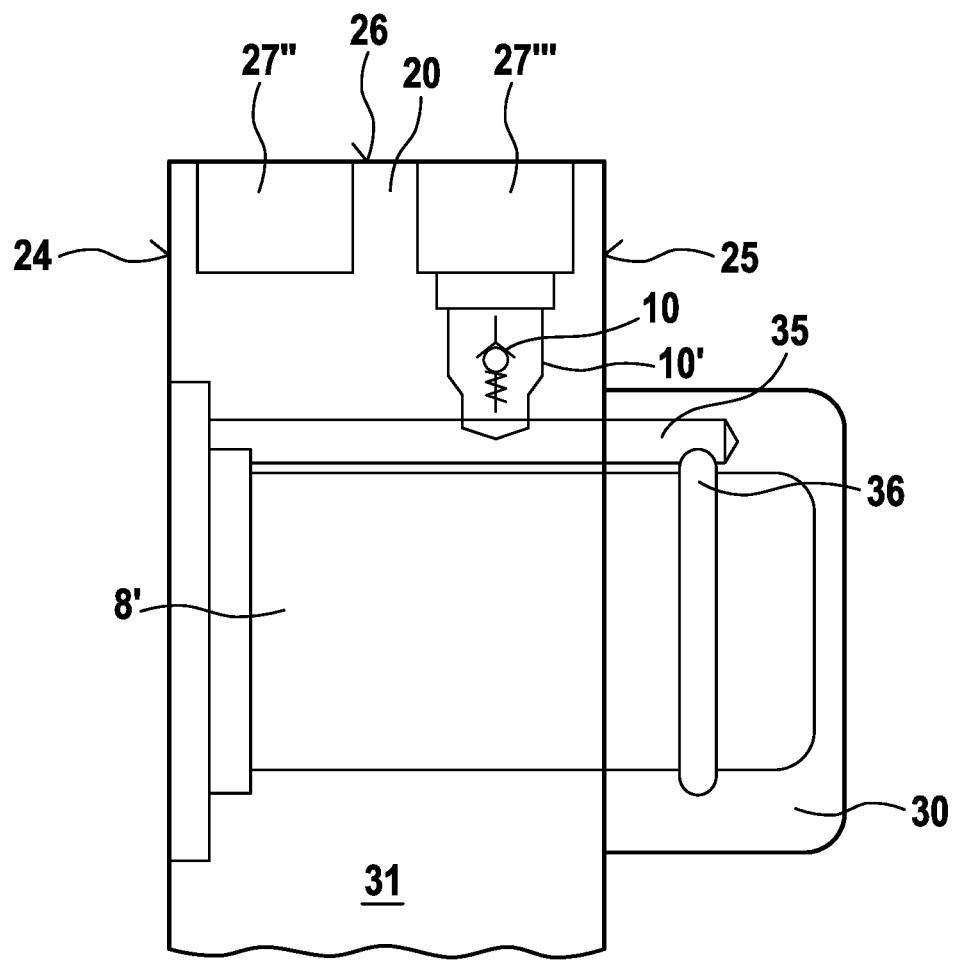
FIG. 4 shows part of a bore arrangement of the hydraulic block of FIGS. 2 and 3.

FIG. 4 shows a fragment of the hydraulic block 20 as viewed looking onto the narrow side 31 opposite the fastening side 29. The dome 30, which elongates the power cylinder bore 8' and protrudes from the valve side 25 of the hydraulic block 20, can be seen. The power cylinder bore 8', like the connections 27", 27''' of the brake fluid container 11, is shown by solid lines. A brake line, which is formed as a bore in the hydraulic block 20 and leads coaxially into one of the connections 27''', extends—after bending parallel to the power cylinder bore 8'—in a wall of the dome 30 outside the power cylinder bore 8' and leads into a circumferential groove 36, which surrounds the power cylinder bore 8' in the dome 30.

The connection 27''' for the brake fluid container 1 has a depression 10' elongating it as a receptacle for the non-return valve 10 in the brake line 35 which runs to the power cylinder bore 8'. The non-return valve 10 is depicted as a circuit symbol in FIG. 4.

To vent the master brake cylinder 15, i.e. to enable air bubbles to be removed from the brake fluid in the master brake cylinder 15, a brake line 43, which connects the master brake cylinder bore 15' to one of the receptacles 16' for the two isolation valves 16, leads tangentially into the master brake cylinder bore 15' at a circumferential point which faces the top side 26 of the hydraulic block 20 (FIG. 3B). On the right in FIG. 3, in close proximity to the mouth of the power cylinder bore 15' on the fastening side 29 of the hydraulic block 20, the tangential arrangement of one of the receptacles 16' for an isolation valve 16 with respect to the top side 26 of the hydraulic block 20 can be seen.

What is claimed is:

1. A hydraulic block for a brake unit of a hydraulic power brake system for an automobile, the hydraulic block comprising:
    a top side, which is configured for seating a brake fluid container and has connections for the brake fluid container;
    a fastening side, which adjoins the top side, is configured for fastening the hydraulic block to a bulkhead of the automobile and into which a master brake cylinder bore leads;
    a motor side, which adjoins the top side and the fastening side, into which a power cylinder bore leads and on which an electric motor can be arranged for displacement of a power piston of a power brake pressure generator in the power cylinder bore;
    connections for hydraulic wheel brakes; and
    a simulator cylinder bore for a pedal travel simulator of the power brake system;
    wherein the power cylinder bore and the simulator cylinder bore are incorporated in the hydraulic block between the top side and the master brake cylinder bore, and a second return line in the hydraulic block runs from a receptacle for an outlet valve to one of the connections for the brake fluid container through the simulator cylinder bore.

2. The hydraulic block as recited in claim 1, wherein the second return line runs from the receptacle for the outlet valve to the master brake cylinder bore and, obliquely with respect to the motor side, from the simulator cylinder bore to the one of the connections for the brake fluid container.

3. The hydraulic block as recited in claim 1, wherein the second return line passes radially through the master brake cylinder bore.

4. The hydraulic block as recited in claim 1, wherein a first return line in the hydraulic block runs from the receptacle for the outlet valve to the power cylinder bore and from the power cylinder bore to the one of the connections for the brake fluid container.

5. The hydraulic block as recited in claim 1, wherein a first portion of the first return line which comes from the receptacle for the outlet valve leads into a groove in the power cylinder bore at a different circumferential point to a second portion of the first return line which runs to the one of the connections for the brake fluid container.

6. The hydraulic block as recited in claim 1, wherein the hydraulic block has a dome, which protrudes from a valve side, opposite the motor side, and into which the power cylinder bore extends, and a portion of a brake line which runs in the hydraulic block from the one of the connections for the brake fluid container in the top side of the hydraulic block to the power cylinder bore, extends through a cylinder wall of the dome.

7. The hydraulic block as recited in claim 1, wherein the hydraulic block has receptacles for valves of a brake pressure control system of the power brake system in a valve side of the hydraulic block, opposite the motor side, of the hydraulic block.

8. The hydraulic block as recited in claim 1, wherein the connections for the wheel brakes are arranged in the motor side of the hydraulic block.

9. The hydraulic block as recited in claim 1, wherein a brake line, which runs in the hydraulic block from the master brake cylinder bore to a receptacle for an isolation valve, leads into the master brake cylinder bore at a circumferential point which faces the top side of the hydraulic block.

10. The hydraulic block as recited in claim 1, wherein the one of the connections for the brake fluid container in the top side of the hydraulic block has a concentric receptacle for a non-return valve, from which a brake line in the hydraulic block runs to the power cylinder bore.

11. The hydraulic block as recited in claim 1, wherein: i) motor connection bores for supplying power to the electric motor of the power brake pressure generator, and ii) a signal bore for control lines and/or signal lines to or from the electric motor, are incorporated in the hydraulic block such that they pass through the hydraulic block from the motor side to a valve side on an imaginary arc around the power cylinder bore.

* * * * *